United States Patent Office 3,754,024
Patented Aug. 21, 1973

3,754,024
OXIDATION PROCESS
Frank Leach Foster and Peter Hay, Manchester, England, assignors to Imperial Chemical Industries Limited, London, England
No Drawing. Filed Feb. 4, 1971, Ser. No. 112,760
Int. Cl. C07c 55/14, 55/04
U.S. Cl. 260—531 R                9 Claims

ABSTRACT OF THE DISCLOSURE

Manufacture of an alkane dicarboxylic acid, particularly adipic acid by feeding an alkanol, alkanone or mixture into nitric acid of 40–70% (preferably 50–65%) strength and fractionally distilling volatile matter from the oxidation zone to keep up the strength of the nitric acid and thereby improve the yield of dicarboxylic acid.

---

This invention relates to a process for the oxidation of cycloalkanols and/or cycloalkanones to produce alkane dicarboxylic acids, and in particular of cyclohexanol and/or cyclohexanone to produce adipic acid.

It is known to manufacture adipic acid by oxidising with nitric acid a mixture of cyclohexanol and cyclohexanone commonly called "KA" (ketone/alcohol) which is obtained by oxidising cyclohexane with an oxygen-containing gas such as air. Catalysts, for example copper and vanadium salts have an advantageous effect on this oxidation. During the nitric acid oxidation the concentration of nitric acid and catalyst falls, partly because water is formed and partly because some of the nitric acid is used up. Even in continuously operated processes the concentration of nitric acid does not remain constant throughout the oxidation zone, being lower in the vicinity of the exit than it is at the entry. In known processes the practice has been to recover nitric acid after isolation of adipic acid and byproducts therefrom and then to concentrate the recovered nitric acid by fractionation before re-using it in the oxidation process.

According to the invention a process for the manufacture of an alkane dicarboxylic acid comprises oxidising an initail material consisting of a cycloalkanol and/or a cycloalkanone by feeding the same into nitric acid in an oxidation zone, the nitric acid supplied to the oxidation zone being of 40 to 70% strength by weight, the temperature being the apparent boiling point (as hereinafter defined) of the mixture at the operating pressure and the rate of feed being such that distillation takes place through a fractionation zone and reduction of nitric acid strength in the oxidation zone is thereby lessened.

Examples of initial material to be used in the process are cyclopentanol, cyclohexanol, cyclohexanone, methylcyclohexanol, methylcyclohexanone, cyclooctanol, cyclododecanol, cyclododecanone, and mixtures of these. The preferred initial material is the cyclohexanol/cyclohexanone mixture known as "KA" since this produces adipic acid, a valuable intermediate for the manufacture of nylon 6.6 (polyhexamethyleneadipamide).

By "apparent boiling point" we mean the temperature at which ebullition takes place with the production of a refluxing stream of aqueous nitric acid. This temperature is lower than true boiling point of the nitric acid in the oxidation zone since bubbles of oxides of nitrogen are formed by the oxidation.

Although the nitric acid supplied to the oxidation zone is of 40 to 70% strength by weight (preferably 50 to 65% by weight) the nitric acid strength within the oxidation zone (defined as weight of nitric acid×100/weight of nitric acid plus water) will be less than this except during start up. Preferably however the mean nitric acid strength within the oxidation zone should not fall below 40%. To obtain greatest advantage from the invention the rate of distillation should be such that the mean nitric acid strength within the oxidation zone should be substantially equal to that of the nitric acid supplied thereto.

For batch-wise operation of the process it is convenient to feed the initial material to be oxidised into a large excess of nitric acid of 40 to 70% (preferably 50 to 65%) strength by weight adding more nitric acid if necessary as the oxidation proceeds.

For continuous operation the initial material and nitric acid may be fed simultaneously into an oxidation zone. For best results incoming nitric acid should become thoroughly mixed with mixture already in the oxidation zone before it meets incoming initial material. This can be accomplished either by efficient stirring or by cycling material from the oxidation zone into the incoming nitric acid.

The pressure in the oxidation zone may be atmospheric or less than this, preferred operating pressures being such that the apparent boiling point of the mixture in the oxidation zone is 70 to 85° C. Such pressures are in the region of 150–200 mm. Hg.

Any catalyst used in the process, particularly copper and vanadium salts may be fed into the oxidation zone in solution in the nitric acid.

After carrying out the process of the invention the product may be worked up in known manner. Thus for example the mixture leaving the oxidation zone may be freed from nitrous fumes by contact with an inert gas e.g. air, or nitrogen and the nitrous fumes, together if desired with those which are evolved during the oxidation may be converted into nitric acid for example by absorption in distillate produced in the process, thereby providing a step in the recovery of nitric acid suitable for re-use in the process. Alkane dicarboxylic acids may be separated by crystallisation of the liquors after freeing from nitrous fumes, and mother liquors may be concentrated to recover further quantities if desired. Dilute nitric acid streams recovered during the work up may be concentrated as in prior art processes but the cost of such concentration is reduced because of the utilisation of reaction heat for fractionation purposes during the oxidation process itself.

Yields of alkane dicarboxylic acids produced by the process of the invention are superior to those obtainable by comparable prior art processes in which no fractional distillation of nitric acid is carried out. In particular the process gives higher yields of adipic acid from cyclohexanol/cyclohexanone ("KA") mixtures than are obtainable by the prior art methods. Moreover the adipic acid is accompanied by smaller total proportions of other dicarboxylic acids, particularly glutaric and succinic acids, than are produced by the prior art methods, so that a greater proportion of the adipic acid is readily recoverable by established methods of crystallisation.

It is a further advantage of the process of the invention that the dissipation of reaction heat through the fractionation reduces the necessity for external cooling of the reaction zone and may be used to provide an effective means of temperature control.

The invention is illustrated but not limited by the following Examples 1, 3 and 5 in which all percentages are by weight. Examples 2, 4 and 6 are comparative examples.

EXAMPLE 1

The apparatus employed consisted of a 1 l. flask with 3 necks into which were fitted:

(a) a glass link stirrer rotating at approx. 600 r.p.m.
(b) a dropping funnel containing the charge of cyclohexanol/cyclohexanone (c) a thermometer and a lagged Vigreux column (360 mm. effective length) leading to a condenser set for distillation into a suitable receiver.

The flask was heated with an electric heating mantle. Nitric acid containing copper and vanadium catalyst (441 g. actual weight containing 50% $HNO_3$, 0.2% copper added as copper metal, and 0.02% vanadium added as ammonium metavanadate) was charged to the flask and heated to the boiling point of approx. 115° C. using the electric heater and allowed to reflux in the Vigreux column in order to warm up the column. Dropwise addition of a cyclohexanol/cyclohexanone mixture was then started. There was an immediate reaction, as shown by the evolution of oxides of nitrogen, and distillation took place from the reactor into the receiver. By suitable adjustment of the electricity supply to the heater and of the rate of addition of the cyclohexanol/cyclohexanone mixture distillation was maintained throughout the reaction temperature of approx. 110° C. Addition of the cyclohexanol/cyclohexanone mixture (60.15 g. actual weight containing 13.68% water i.e. 51.92 g. dry weight—the cyclohexanol:cyclohexanone ratio of the mixture was approx. 9:1) took place over approximately ½ hr. The reaction mixture was allowed to cool, with stirring, over about an hour and subsequently cooled in an ice/water bath and stirred for a further hour at about 5° C. The precipitated adipic acid was filtered off and washed with 140 cc. of iced water. The filter cake was dried overnight at 110° C. to yield a dried product weighing 59.95 g. The combined filtrate and wash sample was analysed for nitric acid by titration and for adipic, glutaric and succinic acids by Gas Liquid Chromatography of the dimethyl esters. The distillates, which amounted to 139 g. was similarly analysed.

The total yields of dibasic acids obtained from the filter cake and the combined filtrate and wash sample were: 123.7 g. adipic acid, 10.3 g. glutaric acid and 3.1 g. succinic acid per 100 g. of dry cyclohexanol/cyclohexanone mixture. In addition a further 0.2 g. adipic acid per 100 g. dry cyclohexanol/cyclohexanone mixture was found in the distillate sample.

From the nitric acid analyses it was shown that the nitric acid strength (as hereinbefore defined) in the reaction mixture at the conclusion of the reaction was 42.4%. The distillate contained 36.3 g. of nitric acid and 102.4 g. water.

The cyclohexanol/cyclohexanone mixture used in this example was obtained by oxidation of cyclohexane with air.

Similar results are obtained by oxidising pure cyclohexanol or pure cyclohexanone under the conditions described in this example.

EXAMPLE 2 (Comparative)

A control experiment in which the conditions were identical with Example 1 except that the Vigreux column/distillation assembly was replaced by a reflux condenser, was carried out using the same cyclohexanol/cyclohexanone mixture. (59.88 g. actual wt.:51.69 g. dry wt.).

The dibasic acid yields were 122.4 g. adipic acid, 11.3 g. glutaric acid and 3.1 g. succinic acid per 100 g. of dry cyclohexanol/cyclohexanone.

From the nitric acid analyses the nitric acid strength of the reaction mixture at the conclusion of the reaction was 35.4%.

EXAMPLE 3

A further experiment was carried out in a similar manner to that of Example 1 except that the pressure was maintained at 140–200 mm. (absolute) and "boiling" occurred at 78–83.5° C. The amount of cyclohexanol/cyclohexanone mixture used was 59.14 g. actual weight (51.05 g. dry weight) and the yields of dibasic acids were 130.0 g. adipic acid; 7.2 g. glutaric acid; and 2.3 g. succinic acid per 100 g. dry cyclohexanol/cyclohexanone mixture. A further 0.1 g. adipic acid per 100 g. dry cyclohexanol/cyclohexanone mixture was found in the distillate.

The nitric acid analysis showed that the nitric acid strength (as defined above in Example 1) at the conclusion of the reaction was 56.9%. The distillate contained 34.8 g. nitric acid and 148 g. water.

EXAMPLE 4 (Comparative)

A control experiment was carried out under similar conditions of temperature and pressure to those used in Example 3 except that the distillation assembly was replaced by a reflux condenser. In this case 59.61 g. actual weight (51.46 g. dry weight) of cyclohexanol/cyclohexanone mixture yielded 124.5 g. adipic acid; 8.8 g. glutaric acid; and 3.7 g. succinic acid per 100 g. dry cyclohexanol/cyclohexanone mixture. The nitric acid strength at the conclusion of the reaction was 37.1%.

EXAMPLE 5

The apparatus used in this example was designed to simulate the operation of a stirred tank continuous reactor. It consisted of a 2 l spherical vessel set in an electric heating mantle and fitted with a Vigreux fractionating column and condenser as described in Example 1, and with a flat stainless steel paddle agitator (7.5 x 2.0 cm.) which was rotated at approx. 100–200 r.p.m. During the course of the reaction the cyclohexanol/cyclohexanone mixture (KA) was continuously pumped into the reactor via a $\frac{1}{16}$ in. (outside diameter) stainless steel capillary tube which discharged at a point below the axis of the stirrer, and the nitric acid required was continuously pumped in via a ⅛ in. (outside diameter) tube discharging at the side wall of the reactor. The amount of cyclohexanol/cyclohexanone used was measured by weighing, and the amount of nitric acid by volume. The reactants were metered into the reactor using a plunger type metering pump. The temperature of the reactor liquid was measured and recorded using a stainless steel sheathed thermocouple connected to a suitable recorder. The reactor, distillate receiver and the cyclohexanol/cyclohexanone and nitric acid reservoirs were connected to a vacuum manifold so that the pressure of the system could be held at any desired value from about 100 mm. to atmospheric pressure by use of a suitable manostat.

Before commencing the reaction the reactor was charged with 200 ml. of a nitric acid solution containing 50.3% nitric acid, 0.2% copper and 0.02% vanadium. The pressure of the system was set at 160–170 mm. Hg and the acid was heated to boiling point to warm up the Vigreux fractionating column. Simultaneous addition of the cyclohexanol/cyclohexanone mixture and of the nitric acid solution (of the same strength and metal content as that used for the initial charge) was then commenced. There was an immediate reaction, as shown by the evolution of oxides of nitrogen, and distillation took place into the distillate receiver. The temperature of the reaction medium was 77–79° C. throughout the addition, which was terminated when the reactor became substantially ful. The reaction mixture was subsequently worked up as described in Example 1. Details of the weight of cyclohexanol/cyclohexanone charged, the operating conditions, the distillate, the nitric acid strength (as hereinbefore defined) of the terminal reaction product, and the yields of adipic, glutaric and succinic acids are shown in the table which follows Example 7.

EXAMPLE 6 (Comparative)

To ascertain the result obtained when there is no distillation to maintain acid strength during reaction, the procedure of Example 5 was repeated under reflux conditions. The starting charge of nitric acid consisted of 200 ml. of a nitric acid solution containing 40.4% nitric acid together with 0.2% copper and 0.02% vanadium in order to simulate the conditions of a stirred tank continuous reactor during operation. The nitric acid added during the reaction was of the same strength as used in Example 5, i.e. 50.3%. The temperature of the reaction was 74–75° C. Experimental details are shown in the table. It may be seen that the yield of adipic acid, and the terminal reaction product nitric acid strength are appreciably lower than when distillation was employed during the reaction.

EXAMPLE 7 (Comparative)

In this example the precedure of Example 6 was repeated at atmospheric pressure, i.e. without concentration and without boiling, which is the conventional way of conducting the reaction. The temperature was within the range 78.5–79.5° C. during the addition. In order to control the temperature in the experiment the electric heating mantle was replaced by a water bath held at about 70° C. As may be seen from the results in the table the yield is greater than for the vacuum reflux Example 6 but is still significantly less than for the distillation/concentration experiment (Example 5).

strength within the oxidation zone and to insure that the nitric acid strength does not fall below 40%, the rate of distillation being such that the mean nitric acid strength within the oxidation zone is at least substantially equal to that of the nitric supplied thereto.

2. Process according to claim 1 wherein the nitric acid supplied to the oxidation zone is of 50 to 65% strength.

3. Process according to claim 1 wherein the cyclohexanol and cyclohexanone are obtained by oxidising cyclohexane with an oxygen-containing gas.

4. Process according to claim 1 operated continuously by feeding initial material and nitric acid simultaneously into an oxidation zone, the said nitric acid becoming thoroughly mixed with mixture already in the oxidation zone before it meets incoming initial material.

5. Process according to claim 1 operated continuously by feeding initial material and nitric acid simultaneously into an oxidation zone, the said nitric acid becoming thoroughly mixed with mixture already in the oxidation zone before it meets incoming initial material.

TABLE

| Ex. No. | Mode of operation | Weight of KA (grams) | | Nitric acid (mol/mol) of KA charged [1] | Pressure range, mm. Hg. | Duration of run (min.) | Yield dibasic acids (grams per 100 g. dry cyclohexanol/cyclohexanone mixture) | | | Terminal nitric acid strength, percent [2] | Distillate | | |
|---|---|---|---|---|---|---|---|---|---|---|---|---|---|
| | | Wet | Dry | | | | Adipic | Glutaric | Succinic | | Total weight gram | Weight $HNO_3$ gram | Weight $H_2O$ gram |
| 5 | Vacuum distillation | 192.53 | 176.11 | 8.6 | 160–168 | 117 | 131.5 | 7.7 | 1.7 | 50.2 | 669.4 | 125.2 | 544.2 |
| 6 | Vacuum reflux | 117.97 | 110.04 | 8.3 | 163–165 | 74 | 124.2 | 9.8 | 3.4 | 39.0 | | | |
| 7 | Atmospheric pressure (not boiling). | 118.65 | 110.68 | 7.0 | (³) | 67 | 127.9 | 7.3 | 2.5 | 38.9 | | | |

[1] This figure relates to the amount of acid pumped in during the reaction period and does not include the "starting charge." KA=cyclohexanol/cyclohexanone mixture.
[2] As hereinbefore defined.
[3] Atmos. pressure.

Comparing Examples 6 and 7 it may be seen that oxidation at low pressure is not in itself beneficial, since the yield of adipic acid produced is diminished. Comparing all these three examples however it is to be seen that the fractional distillation used in Example 5 outweighs the effect of the low pressure operation and in fact produces a higher adipic acid yield than that obtained (Example 7) at the same temperature under atmospheric pressure.

Using 65% nitric acid instead of the 50.3% nitric acid used in Examples 5, 6 and 7 the yields of adipic acid are all increased, but the same comparative effect is seen, the fractional distillation outweighing the non-beneficial effect of low pressure operation, and producing a higher yield than that obtained at the same temperature under atmospheric pressure.

We claim:

1. A process for the manufacture of an alkane dicarboxylic acid comprising supplying nitric acid of 40 to 70% strength by weight to an oxidation zone, feeding into the oxidation zone a mixture consisting essentially of cyclohexanol and cyclohexanone, the temperature in the oxidation zone being the apparent boiling point of the mixture of substances therein, and distilling volatile material through a fractionation zone at a rate controlled by the feed rate of the cyclohexanol/cyclohexanone mixture whereby to lessen the reduction of nitric acid 6. Process according to claim 1 operated at a pressure such that the apparent boiling point of the mixture in the oxidation zone is 70° to 85° C.

7. Process according to claim 1 operated at a pressure such that the apparent boiling point of the mixture in the oxidation zone is 70° to 85° C.

8. Process according to claim 4 operated at a pressure such that the apparent boiling point of the mixture in the oxidation zone is 70° to 85° C.

9. Process according to claim 5 operated at a pressure such that the apparent boiling point of the mixture in the oxidation zone is 70° to 85° C.

References Cited

UNITED STATES PATENTS 2,719,172    9/1955    Nebe et al. _____ 260—531 R
3,290,367   12/1966    White et al. _____ 260—531 R

FOREIGN PATENTS 1,280,840   10/1968    Germany _____ 260—531 R

LORRAINE A. WEINBERGER, Primary Examiner

R. D. KELLY, Assistant Examiner

U.S. Cl. X.R.

260—537 P

UNITED STATES PATENT OFFICE
CERTIFICATE OF CORRECTION

Patent No. 3,754,024  Dated August 21, 1973

Inventor(s) Frank Leach Foster and Peter Hay

It is certified that error appears in the above-identified patent and that said Letters Patent are hereby corrected as shown below:

Column 1, line 9, insert --Claims priority, application

Great Britain February 14, 1970, 1834/70

Signed and sealed this 25th day of December 1973.

(SEAL)
Attest:

EDWARD M. FLETCHER, JR.
Attesting Officer

RENE D. TEGTMEYER
Acting Commissioner of Patents